United States Patent

Weeks

[15] 3,696,156

[45] Oct. 3, 1972

[54] PROCESS FOR PURIFICATION OF FLUOROPERHALOCARBONS

[72] Inventor: Robert Hugh Weeks, Wilmington, Del.

[73] Assignee: E. I. du Pont de Nemours and Company, Wilmington, Del.

[22] Filed: April 3, 1970

[21] Appl. No.: 25,576

[52] U.S. Cl. ............260/648 F, 260/653, 260/653.3
[51] Int. Cl. ........................C07c 17/38, C07c 19/08
[58] Field of Search ................260/653, 648 F, 653.3

[56] References Cited

UNITED STATES PATENTS 2,879,228  3/1959  Holeton..................260/648 F
3,087,974  4/1963  Hauptschein et al......260/653

Primary Examiner—Daniel D. Horwitz
Attorney—John R. Powell

[57] ABSTRACT

Saturated fluoroperhalocarbons of two to six carbon atoms in which halogen is chlorine or fluorine can be purified to readily and economically remove olefinic impurities by contacting, in the vapor phase, the impure saturated fluoroperhalocarbons with alumina containing from about 0.1 percent to about 5 percent of alkali metal hydroxide in the temperature range of from about 180° C. to about 250° C.

4 Claims, No Drawings

PROCESS FOR PURIFICATION OF FLUOROPERHALOCARBONS

BACKGROUND OF THE INVENTION

Pure saturated fluorocarbons and saturated fluorochlorocarbons of two to six carbon atoms are highly inert, odorless, tasteless and non-toxic gases or liquids at atmospheric pressures and ambient temperatures. They are additionally characterized as non-flammable with excellent thermal and chemical stability. They are well known to be useful as dielectric, solvents, heat exchange media and as hydraulic fluids. The lower boiling members are also well known to be useful as refrigerants and as propellants in liquified-gas systems such as in aerosols. Particularly because they are stable, non-flammable, odorless, tasteless and non-toxic, the lower boiling perfluorocarbon such as octafluorocyclobutane is useful as propellant for food formulation.

In the process of manufacture of saturated fluoroperhalocarbons, undesirable by-products are produced with the desired product. The nature of the impurities depends upon the particular saturated fluoroperhalocarbon compound being manufactured and the process conditions. For example, octafluorocyclobutane may be prepared by the thermal dimerization of tetrafluoroethylene at temperatures as high as 500° C. Octafluorocyclobutane thus produced may contain as impurities hexafluoropropene, hexafluorocyclobutene, octafluorobutenes, decafluoromethylcyclobutane, dodecafluorobis(methyl)-cyclobutane, decafluorocyclopentane, dodecafluorocyclohexane as well as some unconverted tetrafluoroethylene and any contaminant present in the reactant originally. Crude octafluorocyclobutane may be purified by distillation to yield a product containing about 2,000 parts per million (ppm) of unsaturated impurities. Further attempts to reduce the level of unsaturated impurities to a few parts per million by further distillation or other physical methods have been difficult and impractical for commercial use. Unsaturated impurities present in octafluorocyclobutane purified by distillation are hexafluoropropene, octafluorobutene-2 (cis and trans), and octafluoroisobutylene. Octafluorobutenes usually constitute the major components of the above unsaturated contaminants.

Low level of unsaturated impurities is particularly required when the intended use of polyfluoroperhalocarbon is as propellant in aerosols or as propellant for food formulations whereby inhalation or ingestion by human beings must be considered. While pure saturated fluorocarbons and saturated polyfluorochlorocarbons are usually non-toxic, the unsaturated compounds are often highly toxic. It is thus highly desirable and necessary that the amount of unsaturated impurities in saturated fluoroperhalocarbons be reduced to a considerably lower level than is possible by distillation as described above.

In "Organic Fluorine Chemistry" by W. A. Sheppard and C. M. Sharts, W. A. Benjamin, Inc., N. Y., N. Y., 1969 p. 452, inhalation toxicity data are given for polyfluorochlorocarbons from tests on rats or mice. The article indicates that the saturated fluoroperhalocarbons are inert substances. With $CClF_2CF_3$, $CF_3CF_3$ and octafluorocyclobutane, nitrogen of the atmosphere may be substituted with these compounds and the resultant perfluorohalocarbon-oxygen atmosphere may be inhaled for several hours without harmful effects. Unsaturated compounds such as the octafluorobutenes on the other hand are toxic substances. Saturated fluoroperhalocarbons containing less than 2 ppm of unsaturated impurities are desired.

DESCRIPTION OF THE PRIOR ART

There are processes known in the art for reducing the amount of contaminants in the saturated fluorocarbons to low levels. Parmelee in U. S. Pat. No. 2,738,371 teaches a procedure of decreasing hydrogen-containing impurities in saturated fluorocarbons by contacting the fluorocarbon with a nitrogen-containing basic compound such as ammonia or amines. Heberling in U. S. Pat. No. 2,999,885 teaches preparation of purified saturated fluorocarbons of two to six carbon atoms by contacting the impure saturated fluorocarbon with an aqueous solution of potassium permanganate of about 5 percent to about 40 percent concentration, which contains from about 0.5 parts to about 2 parts of alkali metal hydroxide per part of the permanganate, at a temperature of from about 20° C. to about 95° C. Marcali in U. S. Pat. No. 3,004,075 teaches purification of saturated fluorocarbon of two to six carbon atoms by contacting impure fluorocarbon with a mixture of piperidine or pyrrolidine with pyridine in the temperature range of 0° C. to about 80° C.

The processes of U. S. Pat. No. 2,999,885 and U. S. Pat. No. 3,004,075 are effective in reducing the contaminants in fluorocarbons to a level of less than 2 ppm of unsaturated impurities, but are not economically advantageous for purification of large quantities of fluorocarbon due to the high cost of the chemical reactants required, the protracted time necessary to reduce the undesirable contaminants to the desired level and the steps necessary to separate the purified fluorocarbon from the reactants.

SUMMARY OF THE INVENTION

The process for purifying a saturated fluoroperhalocarbon of two to six carbon atoms containing olefinic impurities comprises contacting the impure fluoroperhalocarbon in the vapor phase and at a temperature of from about 180° C. to about 250° C. with alumina containing a basic alkali metal or alkaline earth metal hydroxides and oxides to reduce the level of olefinic impurities to less than 2 ppm.

DESCRIPTION

The invention consists of a process for purifying a saturated fluoroperhalocarbon of two to six carbon atoms containing olefinic impurities comprising perfluoroolefins and perfluorochloroolefins by use of a process which comprises contacting said impure saturated fluoroperhalocarbon in the vapor phase and at a temperature of from about 180° C. to about 250° C. with alumina containing at least about 0.1 percent and preferably from about 0.1 percent to about 5 percent by weight of a basic compound selected from the group of alkali metal hydroxides, alkali metal oxides, alkaline earth metal hydroxides and alkaline earth metal oxides. Purified saturated fluoroperhalocarbon containing less than 2 ppm of olefinic impurities is then separated from the alumina.

By saturated fluoroperhalocarbon is meant an aliphatic compound of two to six carbon atoms consisting only of carbon, fluorine and optionally chlorine wherein the carbon atoms are singly bonded to at least one carbon atom and are also singly bonded to fluorine or chlorine atoms. The compound contains a plurality of fluorine atoms and may or may not contain chlorine atoms. Some representative examples of fluoroperhalocarbons are 1,1,2-trichloro-1,2,2-trifluoroethane, 1,2-dichloro-1,1,2,2-tetrafluoroethane, 1-chloro-1,1,2,2,2-pentafluoroethane, hexafluoroethane, 1-chloroheptafluoropropane, 2-chloroheptafluoropropane, decafluorobutane, 1-chlorononafluorobutane, 2,3-di-chlorooctafluorobutane, octafluorocyclobutane, 1,2-bis(trifluoromethyl)hexafluorocyclobutane and 1,3-bis(trifluoromethyl)hexafluorocyclobutane.

In the process of manufacture of saturated fluoroperhalocarbons many undesired by-products as outlined above are formed. These by-products arise from condensation, thermolysis or dehalogenation of the reactant-product mixture. The process of this invention reduces the olefinic by-products to less than 2 ppm. The main advantages of the process over the prior art methods are (1) alumina adsorbent is readily and cheaply regenerated for reuse to minimize the cost of treating agent; (2) the contaminants are removed very rapidly and (3) the purified product is recovered free of treating agent.

In general any of the many available aluminas may be employed in the process of this invention. It is necessary that alumina contain at least about 0.1 percent of alkali metal hydroxide or its equivalent such as $Na_2O$. While activated alumina which is usually characterized by its relatively high surface area, e.g. from about 10 to 300 square meters per gram, is advantageously used in the process of this invention, high surface area is not a necessary quality for useful aluminas. Aluminas having a surface area from about 0.1 square meter per gram to about 200 square meters per gram have been used successfully. In the practice of this process the state of subdivision of alumina is of greater importance than the surface area. The particle size of alumina should be of such size that good contact of vaporized perfluorochlorocarbon with alumina is obtained together with easy passage of vapor through the alumina bed. Generally alumina of 8–400 mesh is satisfactory.

The alumina should preferably contain from about 0.1 percent to about 5 percent of alkali metal hydroxide or its equivalent. When the alkali metal hydroxide is less than about 0.1 percent, the capacity of the alumina to remove unsaturated impurities is very rapidly exceeded and frequent regeneration becomes necessary. Alkali metal hydroxide content of greater than 5 percent is operable but the metal hydroxide content of greater than 5 percent is operable but the attrition of alumina on regeneration is increased. The alkali metal hydroxide content in alumina of from 0.1 percent to about 5 percent is preferred. Alumina containing alkalinity less than that equivalent to 0.1 percent sodium hydroxide may be made useful by adding alkali metal hydroxide to alumina. Such addition may be made by dissolving desired amount of alkali metal hydroxide in just sufficient amount of water to wet the surface of alumina, driving off gross water by gentle heating and then gradually heating from about 250° C. to about 400° C. in a stream of nitrogen.

Alkali metal hydroxides useful in the present invention include those of lithium, potassium, sodium, rubidium and cesium. Sodium hydroxide is preferred because of its availability and low cost. Alkaline earth metal hydroxides such as those of magnesium, calcium, strontium or barium may also be used. Mixtures of metal hydroxides may also be used.

The process of the present invention is carried out in the temperature range of about 180° C. to about 250° C. The process is operable at temperatures lower than 180° C., for example at 150° C., but the rate of removal of the impurities is decreased sufficiently that the flow of impure saturated fluorohalocarbon through the alumina bed must be reduced to uneconomical levels. At temperatures over 250° C. thermal decomposition of the fluoroperhalocarbon may take place on the surface of the alumina.

The flow rate of impure saturated fluoroperhalocarbon through the alumina bed may vary from about 10 to about 150 volumes of fluoroperhalocarbon (at standard temperature and pressure) per hour per volume of alumina. The flow rate chosen will depend upon the amount of unsaturated impurities present. With the unsaturated impurities concentration of around 2000 ppm, a flow rate of around 55 volumes per hour per volume of alumina is useful. The useful range of contact time of the vaporized polyfluoroperhalocarbon with alumina may be in the range of about 10 seconds to about 300 seconds.

Pressure at which the purification is carried out does not appear to be an important factor. Process has been carried out at atmospheric pressure and at pressures higher than atmospheric pressure with identical results.

It appears that alumina is participating in the reaction of removal of unsaturated impurities and the function of alumina is not simply that of support for alkali metal hydroxides. Attapulgus clay treated with sodium hydroxide solution and dried as described above for alumina had no capacity for removal of unsaturated impurities.

While the mechanism of the removal of unsaturated impurities by alkali metal hydroxide-treated alumina is not presently understood, it is clear that the removal involves more than the usual reversible adsorption of the unsaturated compounds on the alumina surface. Attempted regeneration of spent alumina bed by the usually practiced procedure of heating the alumina bed to as high as 500° C. in the presence of a stream of inert gas (nitrogen) did not liberate any of the unsaturated impurities removed or regenerate the alumina bed. Alumina used in this purification process is referred to as spent when the effluent contains more than 2 ppm of unsaturated compounds. The alumina bed can be regenerated by contacting the spent alumina bed with a dilute aqueous alkali metal hydroxide solution followed by drying at 250°–400° C.

EXAMPLES

Example I

The reactor tube to contain alumina consisted of a 2.5 cm. (1 inch) diameter stainless steel pipe of 60 cm.

(24 inches) length equipped with electrical heating means. A thermocouple lead was placed in the reactor to measure the temperature of the alumina bed. Alumina (8–14 mesh, 200 square meters per gram surface area, NaOH eq. 0.81%) 140 g. was placed in the stainless steel reactor tube. Heating was applied to the tube while dry nitrogen was passed through the alumina bed. When the temperature of 200° C. was reached, nitrogen was turned off and vaporized impure octafluorocyclobutane containing 2000 ppm of unsaturated impurities comprising largely of perfluorobutene-2 (cis and trans) was introduced into the reactor. The rate of octafluorocyclobutane was monitered by means of a rotameter and the flow was maintained at 59 volumes per hour per volume of alumina. The effluent from the reactor was recovered by condensation in a cold trap cooled by a mixture of dry ice and acetone. The effluent from the reactor was sampled periodically and analyzed by high resolution gas chromatograph. The alumina bed was considered to be spent when the reactor effluent contained more than 2 ppm of unsaturated impurities. In this example, 830 g. of impure octafluorocyclobutane containing 2000 parts per million of unsaturated impurities was purified to contain less than 2 ppm of unsaturated impurities before the effluent from the reactor showed 2 ppm of unsaturated impurities. Material balance of the octafluorocyclobutane used and the octafluorocyclobutane recovered indicated almost insignificant loss of the compound on the alumina.

Examples II – IV

Example I was repeated at temperature of 180° C., 200° C. and 250° C. The alumina used was 140 g. of 8–14 mesh, 200 square meters per gram surface area and NaOH eq. 0.81%. Reaction was carried out at atmospheric pressure and a flow rate of 55 volumes per hour per volume of alumina. The results are tabulated in Table I.

TABLE I

| Ex. | Temperature (°C.) | Wt. of Octafluorocyclobutane purified (g.)* |
|---|---|---|
| II | 180 | 800 |
| III | 200 | 830 |
| IV | 250 | 1210 |

*wt. purified before effluent contained more than 2 ppm unsaturated impurities

Example V

An isomeric mixture of bis(trifluoromethyl)hexafluorocyclobutane containing approximately 2000 ppm of unsaturated impurities comprising mostly of perfluorobutene-2 was purified at 250° C. by the process of Example I. Using 140 g. of alumina of 8–14 mesh, 200 square meters of surface area and NaOH eq of 0.81% approximately 1500 g. of bis(trifluoromethyl)hexafluorocyclobutane was purified to a level of less than 2 ppm of unsaturated impurities before the effluent contained more than 2 ppm of unsaturated impurities.

Other fluoroperhalocarbons purified of unsaturated impurities include dichlorodifluoromethane, 1,2-dichloro-1,1,2,2-tetrafluoroethane, 1-chloro-1,1,2,2,2-pentafluoroethane, 1,1,2-trichloro-1,2,2-trifluoroethane and trichloromonofluoromethane. Monochlorodifluoromethane on the other hand was completely decomposed under the conditions employed.

Examples VI – X

The criticality of alkalinity in alumina and the relative independence of the activity of the alumina on the surface area of the alumina are illustrated in Table II. The experiments were carried out as described in Example I using octafluorocyclobutane containing about 2000 ppm of unsaturated impurities comprising largely of perfluorobutene-2 at the reaction temperature of 250° C. and at atmospheric pressure.

TABLE II

| Ex. | Size (mesh) | Surface area meters$^2$/gm. | NaOH eq. % | Wt. Alumina used | Flow rate vol./hr./vol. alumina | Octafluorocyclobutane purified* (g.) |
|---|---|---|---|---|---|---|
| VI | 8–14 | 200 | 0.81 | 140 | 59 | 1200 |
| VII | 14–20 | 210 | 0.48 | 140 | 53 | 1154 |
| VIII | 8–14 | 100 | 0 | 140 | 58 | 0 |
| IX | 80–200 | 210 | 0.98 | 200 | 60 | 1200 |
| X | 325 | 0.1 | 0.20 | 140 | 56 | 1200 |

*Unsaturated impurities reduced to less than 2 ppm.

It can be seen that when an alumina does not have any alkalinity, as in Example VII, no purification is possible even though the surface area may be appreciable. Alkalinity of an alumina sample is determined by placing a sample in water and titrating with a standard solution of hydrochloric acid. The alumina of Example VIII gave a slightly acid reaction in water (pH 5) and thus has no alkalinity.

Example XI

The alumina of Example VIII which did not have any capacity for the removal of unsaturated impurities was treated with an aqueous solution of sodium hydroxide to increase its alkalinity. The alumina was contacted with 2.8 g. of sodium hydroxide in 150 ml. of water. After the removal of most of the water by gentle heating, the treated alumina was placed in the stainless steel reactor of Example I. The treated alumina in the reactor was then heated at 250° C. for 24 hours while a stream of dry nitrogen was passed through the alumina bed. The alumina so treated had alkalinity equivalent to 1.92 percent sodium hydroxide. Contacting of octafluorocyclobutane containing 2000 ppm of unsaturated impurities comprising largely of perfluorobutene-2 as described in Example I with the treated alumina at 250° C. and atmospheric pressure resulted in the preparation of 1450 g. of purified octafluorocyclobutane containing less than 2 ppm of unsaturated impurities.

Treatment of alumina with alkali metal hydroxide not only activates an inactive alumina but it is also possible to increase the capacity of an alumina sample to remove unsaturated impurities by increasing the alkalinity content of the alumina. Thus alumina A of Example 4 which had alkalinity equivalent to 0.81 percent sodium hydroxide and which had a capacity to purify 1200 g. of octafluorocyclobutane containing 2000 ppm of unsaturated impurities per 140 g. of alumina was treated with an aqueous solution of sodium hydroxide as described above. Alumina A thus treated had alkalinity equivalent to 2.94 percent of sodium hydroxide. This alumina then had a capacity to purify 2200 g. of impure octafluorocyclobutane containing 2000 ppm of unsaturated impurities.

Example XII

In line with the intended use of saturated fluoroperhalocarbons as propellants, the alumina was considered to be spent when the effluent from the alumina bed contained more than 2 ppm of unsaturated impurities. Attempted regeneration of spent alumina by the usual procedure of heating to a high temperature (500° C.) in the presence of inert gas (nitrogen) was not successful. Spent alumina from Example I was heated at 500° C. in a stream of dry nitrogen for two hours and then at 250° C. for 29 hours. When thus thermally treated spent alumina was used in the purification of impure octafluorocyclobutane of Example I immediate breakthrough of unsaturates (i.e. greater than 2 ppm) was experienced.

Example XIII

Regeneration of spent alumina, however, may be accomplished by treating the spent alumina with alkali metal hydroxide solution. Spent alumina in the reactor was contacted with a 4 percent aqueous solution of sodium hydroxide for 15–20 hours. The excess liquid caustic solution was then drained from the alumina bed. The alumina bed was then heated to 250° C. in a stream of dry nitrogen. When thus caustic treated spent alumina was used in the purification of impure octafluorocyclobutane as in Example I, capacity (i.e. weight of octafluorocyclobutane purified per unit weight of alumina) equivalent to the original was obtained. It has also been found that the original purification capacity may be restored up to about the third regeneration of the spent alumina. Subsequent regeneration of spent alumina results in gradual attrition of the alumina such that the capacity is reduced about 7 percent with each regeneration after the third regeneration.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for purifying an impure saturated fluoroperhalocarbon in which the impurities comprise perfluoroolefins and perfluorochloroolefins;

said fluoroperhalocarbons containing from two to six carbon atoms and a plurality of fluorine atoms, and optionally containing chlorine atoms;

said process comprising contacting said impure fluoroperhalocarbon in the vapor phase, at a temperature of from about 180° C. to about 250° C., with alumina containing at least about 0.1 percent by weight of a basic compound selected from among alkali metal hydroxides, alkali metal oxides, alkaline earth metal hydroxides and alkaline earth metal oxides whereby said impurities are reduced to below 2 ppm; and separating the purified saturated fluoroperhalocarbon from said alumina.

2. The process of claim 1 in which the alumina contains from about 0.1 percent to about 5 percent by weight of the basic compound.

3. The process of claim 2 in which the basic compound is selected from the group consisting of at least one of the group of lithium hydroxide, potassium hydroxide, sodium hydroxide, rubidium hydroxide, cesium hydroxide, magnesium hydroxide, calcium hydroxide, strontium hydroxide and barium hydroxide.

4. The process of claim 2 in which the basic compound is sodium hydroxide.

\* \* \* \* \*